United States Patent [19]

Lukashov et al.

[11] 4,127,805

[45] Nov. 28, 1978

[54] DEVICE FOR CONNECTING TUNED POWER TRANSMISSION LINE TO A.C. NETWORK

[75] Inventors: Eduard S. Lukashov; Marina K. Yakobson, both of Novosibirsk, U.S.S.R.

[73] Assignee: Sibirsky Nauchno-Issledovatelsky Institut Energetiki, Novosibirsk, U.S.S.R.

[21] Appl. No.: 755,040

[22] Filed: Dec. 28, 1976

[51] Int. Cl.² .............................................. H02J 3/24
[52] U.S. Cl. ...................................... 323/120; 307/17
[58] Field of Search ............................ 307/17, 83, 89; 323/44 R, 45, 48, 120

[56] References Cited

U.S. PATENT DOCUMENTS

| 2,000,776 | 5/1935 | Mercerceau et al. | 323/120 X |
| 2,812,488 | 11/1957 | Wright | 323/120 X |
| 2,866,152 | 12/1958 | Prior | 323/44 R |

*Primary Examiner*—A. D. Pellinen
*Attorney, Agent, or Firm*—Lackenbach, Lilling & Siegel

[57] ABSTRACT

A device for connecting a tuned power transmission line to an a.c. network includes the following units that are serially interconnected in any combination: a phase transposition unit for phase shifting the voltage through an angle which is a multiple of the natural shift of voltages of opposite phases; a coupling transformer with a switchable group of connections of its windings, which matches the voltages of the tuned power transmission line and the a.c. network and effects a voltage phase shift which is a multiple of 180°; and a transverse voltage regulation transformer which makes it possible to smoothly change the voltage phase shift under load.

6 Claims, 11 Drawing Figures

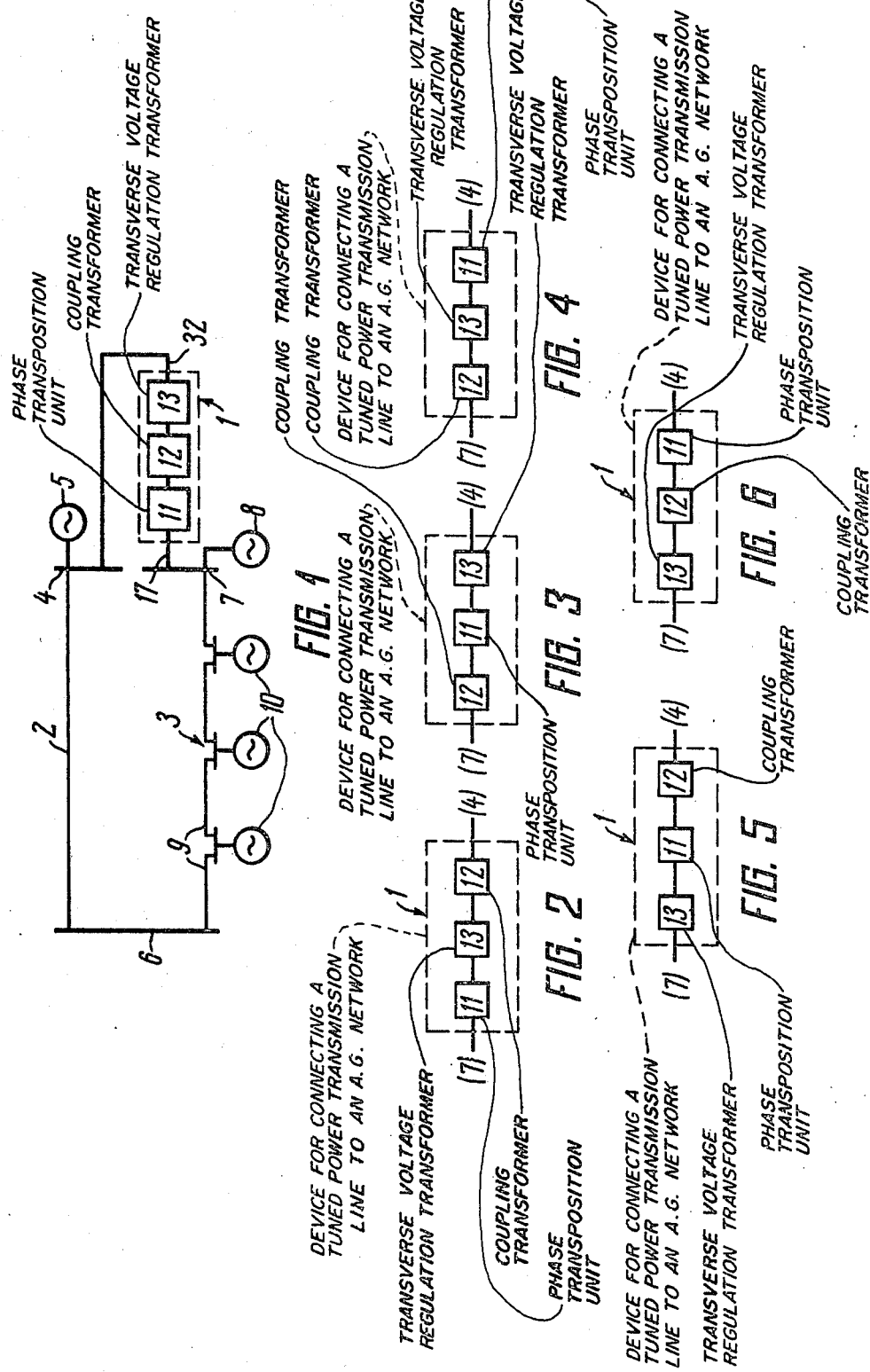

DEVICE FOR CONNECTING TUNED POWER TRANSMISSION LINE TO A.C. NETWORK

FIELD OF THE INVENTION

The present invention relates to transmission and distribution of electrical energy and, more particularly, to devices for connecting a tuned power transmission line to an a.c. network. The invention is applicable to power engineering.

A device for connecting a tuned power transmission line to an a.c. network is employed whenever it is necessary to ensure parallel operation of a power station, whose power goes to the tuned power transmission line, and a local power system, which services the area around the sending end of the tuned power transmission line, if the local power system is electrically connected to the receiving electrical system via conventional power lines.

Transmission of electrical energy through conventional a.c. power lines is only possible over distances of a few hundred kilometers. The range of a.c. power transmission lines is limited by an increase in the line's reactance with an increase in the line's length, which leads to a decrease in the steady-state stability limit of the transmitted power.

One of the ways to increase the range of a.c. power transmission lines is longitudinal capacitance compensation of a line's reactance. If a line includes a number of serially placed capacitors, this reduces the overall reactance and accordingly increases the steady-state stability. A power line of a considerable length requires substantial amounts of auxiliary equipment.

If a power transmission line is more than 1,500 km long and the a.c. frequency is 50 Hz (or if a line is more than 1,200 km long and the a.c. frequency is 60 Hz), the reactance is reduced; if a power transmission line is 3,000 km long and the a.c. frequency is 50 Hz (or if a line is 2,400 km long and the a.c. frequency is 60 Hz), the reactance is equal to zero and has no effect on the steady-state stability limit.

An ideal half-wave line is characterized in that the voltage at the sending end of the line is independent of the load being conveyed (with a constant voltage at the receiving end).

If a power transmission line is about 3,000 km long and the a.c. frequency is 50 Hz (or if a line is about 2,400 km long and the a.c. frequency is 60 Hz), it is preferable to employ a tuned power transmission line, i.e. a line having the properties of a half-wave line. For this purpose, the line is provided with specially designed, serially placed reactors, or capacitors placed in parallel. It is possible to use both reactors and capacitors.

In order to avoid such undesired effects as self-excitation or self-oscillation of generators of a transmitting station or system, the power line should be tuned to an angle which is somewhat greater than 180°, i.e. to an angle between 200° and 210°.

In an actual tuned line, the divergence angle of the voltage vectors at the beginning and end of the line alters approximately from 180° to about 200°-210° with a change in the load from the idle conditions to that of demand. If a tuned power transmission line is in a territory where there exists a developed electrical network, the electrical system which services the area around the sending end of the tuned power transmission line may be electrically connected to the receiving power system through a series of conventional a.c. power lines which connect individual power stations, substations and power consumption points. Depending upon the direction in which power is transmitted through individual circuits, the angle between voltage phases at the bars of the receiving and local power systems may vary within a broad range.

When it is necessary to ensure parallel operation of a tuned power transmission line and conventional a.c. lines, the major obstacle to be overcome is the considerable phase shift between the voltages at the bars of the second end of the tuned power transmission line and the bars of the local power system. Direct connection of the line between these bars may lead to an impermissible power overflow and upset the normal operation of the entire electrical system.

A tuned power transmission line can operate in parallel with an a.c. network if between the bars of the sending end of the tuned power line and the bars of the local power system there is placed a device which makes it possible to alter the applied voltage phase by an arbitrarily chosen angle and adjust this angle within certain limits.

SUMMARY OF THE INVENTION

It is an object of the present invention to provide a device for connecting a tuned power transmission line to an a.c. network, which ensures parallel operation of the tuned power transmission line and the a.c. network.

The foregoing object is attained by providing a device for connecting a tuned power transmission line to an a.c. network, which comprises, according to the invention, a number of serially interconnected units, including a phase transposition unit for phase shift of the voltage through an angle that is a multiple of the natural phase shift of voltages of opposite phases; a coupling transformer with a switchable group of connections of its windings, which matches the voltages of the tuned power transmission line and the a.c. network and effects a voltage phase shift which is a multiple of 180°; and a transverse voltage regulation transformer which makes it possible to smoothly change the voltage phase shift under load. The above-mentioned units may be placed in any of the following orders: the phase transposition unit, the transverse voltage regulation transformer and the coupling transformer; or the coupling transformer, the phase transposition unit and the transverse voltage regulation transformer; or the coupling transformer, the transverse voltage regulation transformer and the phase transposition unit; or the transverse voltage regulation transformer, the phase transposition unit and the coupling transformer; or the transverse voltage regulation transformer, the coupling transformer and the phase transposition unit.

The present invention provides for mutual reserving of generators of the tuned power transmission line and the local power system. The invention makes it possible to regulate the overflow of power between the sending end of the tuned power transmission line and the local power system, as well as to minimize total power losses. Parallel operation of the tuned power transmission line and the a.c. network raises the overall steady-state and transient stability of the power system and reduces the chance of self-excitation and self-oscillation of generators of the tuned power transmission line.

BRIEF DESCRIPTION OF THE DRAWINGS

Other objects and advantages of the present invention will become more apparent from the following detailed description of preferred embodiments thereof taken in conjunction with the accompanying drawings, wherein:

FIG. 1 is a block diagram of a device for connecting a tuned power transmission line to an a.c. network, in accordance with the invention;

FIG. 2 is a block diagram showing a second embodiment of the device for connecting a tuned power transmission line to an a.c. network, in accordance with the invention;

FIG. 3 is a block diagram showing a third embodiment of the device for connecting a tuned power transmission line to an a.c. network, in accordance with the invention;

FIG. 4 is a block diagram showing a fourth embodiment of the device for connecting a tuned power transmission line to an a.c. network, in accordance with the invention;

FIG. 5 is a block diagram showing a fifth embodiment of the device for connecting a tuned power transmission line to an a.c. network, in accordance with the invention;

FIG. 6 is a block diagram showing a sixth embodiment of the device for connecting a tuned power transmission line to an a.c. network, in accordance with the invention;

DETAILED DESCRIPTION OF THE INVENTION

Figure 7:
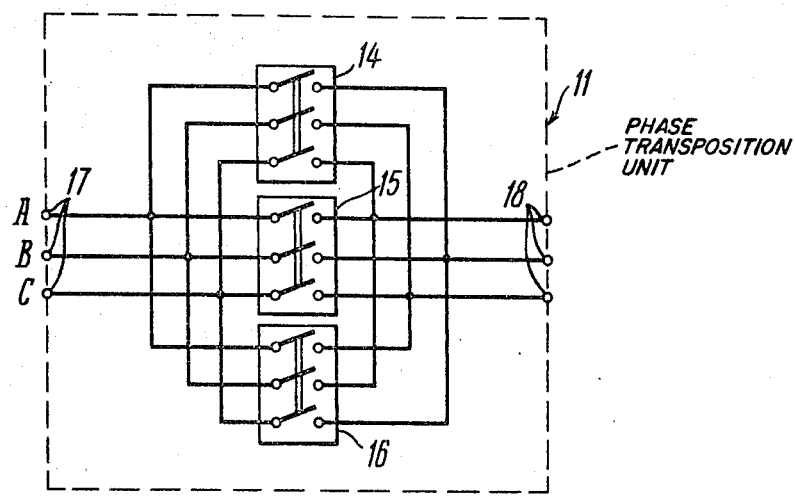
FIG. 7 is a block diagram of a phase transposition unit, in accordance with the invention.

FIG. 1 is a block diagram of a device 1 for connecting a tuned power transmission line 2 to an a.c. network 3. The tuned power transmission line 2 connects bars 4 of a sending station 5 and bars 6 of a receiving power system (not shown).

The a.c. network 3 comprises bars 7 of a local power system 8, and conventional a.c. power lines 9 to which there are connected generators 10 of power systems (not shown) located along the tuned power transmission line 2.

The device 1 for connecting the tuned power transmission line 2 to the a.c. network 3 comprises a number of serially interconnected units, including a phase transposition unit 11 for a phase shift of the voltage through an angle which is a multiple of the natural phase shift of voltages of opposite phases; a coupling transformer 12 which matches the voltages of the tuned power transmission line 2 and the a.c. network 3 and effects a voltage phase shift which is a multiple of to 180°; and a transverse voltage regulation transformer 13 which makes it possible to smoothly change the voltage phase shift under load.

The phase transposition unit 11 is connected to the bars 7 of the local power system 8. The coupling transformer 12 is connected to the phase transposition unit 11. The transverse voltage regulation transformer 13 is connected to the coupling transformer 12 and the bars 4 of the sending station 5.

The phase transposition unit 11, the coupling transformer 12 and the transverse voltage regulation transformer 13 may be placed in any order. One of the possible connections is shown in FIG. 2. In this case, the phase transposition unit 11 is connected to the bars 7 of the local power system 8, the transverse voltage regulation transformer 13 is connected to the phase transposition unit 11, and the coupling transformer 12 is connected to the transverse voltage regulation transformer 13 and the bars 4 of the sending station 5. In FIG. 3, the coupling transformer 12 is connected to the bars 7 of the local power system 8, the phase transposition unit 11 is connected to the coupling transformer 12, and the transverse voltage regulation transformer 13 is connected to the phase transposition unit 11 and the bars 4 of the sending station 5. In FIG. 4, the coupling transformer 12 is connected to the bars 7 of the local power system 8, the transverse voltage regulation transformer 13 is connected to the coupling transformer 12, and the phase transposition unit 11 is connected to the transverse voltage regulation transformer 13 and the bars 4 of the sending station 5. In FIG. 5, the transverse voltage regulation transformer 13 is connected to the bars 7 of the local power system 8, the phase transposition unit 11 is connected to the transverse voltage regulation transformer 13, and the coupling transformer 12 is connected to the phase transposition unit 11 and the bars 4 of the sending station 5. In FIG. 6, the transverse voltage regulation transformer 13 is connected to the bars 7 of the local power system 8, the coupling transformer 12 is connected to the transverse voltage regulation transformer 13, and the phase transposition unit 11 is connected to the coupling transformer 12 and the bars 4 of the sending station 5.

The phase transposition unit 11 (FIG. 7) is a commutation unit comprising three switches 14, 15 and 16 placed in parallel between terminals 17 and 18. Circuit breakers can be employed instead of the switches. The electrical connections are made so that through the switch 14, phase A of the terminals 17 is connected to phase B of the terminals 18, phase B of the terminals 17 is connected to phase C of the terminals 18, and phase C of the terminals 17 is connected to phase A of the terminals 18. Through the switch 16, phase A of the terminals 17 is connected to phase C of the terminals 18, phase B of the terminals 17 is connected to phase A of the terminals 18, and phase C of the terminals 17 is connected to phase B of the terminals 18. The switch 15 connects like phases of the terminals 17 and 18.

The coupling transformer 12 (FIG. 8) comprises a transformer 19 per se. The rated voltages of primary windings 20 of said transformer 19 correspond to the voltage accross the bars 4 of the sending station 5. The rated voltages of secondary windings 21 of said transformer 19 correspond to the voltage across the bars 7 of the local power system 8. The coupling transformer 12 further includes switches 22, 23, 24 and 25 connected to the secondary windings 21 of the transformer 19. With the aid of the switches 22, 23, 24 and 25, the transformer 19 may be provided with a group for connecting windings Yo/Y−12 and a group for connecting windings Yo/Y−6. The switches 22 and 23 serve for star connection of the secondary windings 21 of the transformer 19.

The switches 24 and 25 connect the secondary windings 21 of the transformer 19 to terminals 26 of phase conductors. The primary windings 20 of the transformer 19 are connected to terminals 27. The function of the switches 22, 23, 24 and 25 can be performed by circuit breakers.

The primary windings 20 of the transformer 19 are provided with means 28 for smoothly changing the number of turns of the winding 20 in order to regulate the voltage under load.

Figure 9:
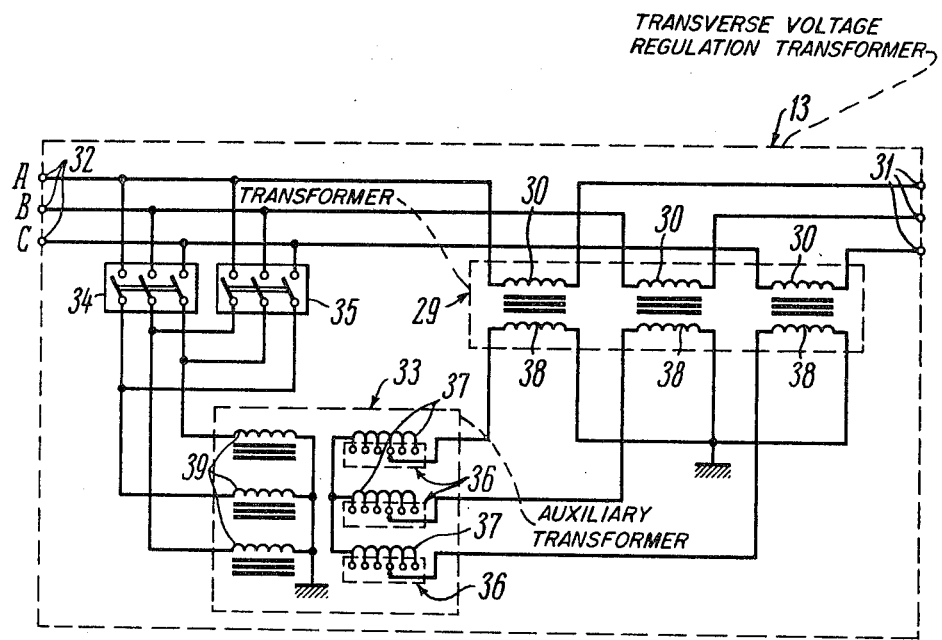
FIG. 9 is a block diagram of the electrical connections of a transverse voltage regulation transformer, in accordance with the invention.

FIG. 9 is a block diagram of the transverse voltage regulation transformer 13 which makes it possible to smoothly change the voltage phase shift under load. The transverse voltage regulation transformer 13 comprises a transformer 29 per se, whose secondary windings 30 are connected in series with the phases A, B and C, respectively, between terminals 31 and 32. The transverse voltage regulation transformer 13 further includes an auxiliary transformer 33 and switches 34 and 35. Secondary windings 37 of the auxiliary transformer 33 are provided with means 36 for smoothly changing the number of turns of the winding under load and are connected to primary windings 38 of the transformer 29. The switches 34 and 35 connect primary windings 39 of the auxiliary transformer 33 to the phases A, B and C.

The transverse voltage regulation transformer 13 must have an angle adjustment range of not less than ±30°.

The proposed device for connecting a tuned power transmission line to an a.c. network operates as follows.

First, there is determined the phase shift angle between the voltage across the bars 4 (FIG. 1) of the sending station 5 and the voltage across the bars 7 of the local power system 8. Depending upon the magnitude of the phase shift between said bars 4 and 7, the switches commutate the phase transposition unit 11, the coupling transformer 12 and the transverse voltage regulation transformer 13.

The phase transposition unit 11 (FIG. 7) changes stepwise the phase shift of the voltage applied to the phase transposition unit 11 by an angle which is a multiple of to the natural phase shift between voltages of opposite phases, each step being 120°.

Figure 10:
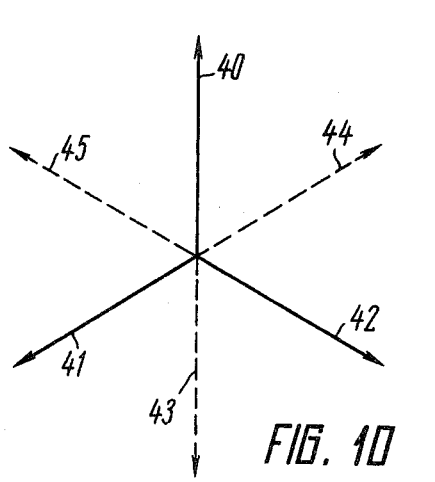
FIG. 10 is a vector voltage diagram of the phase transposition unit and the coupling transformer, in accordance with the invention.

When to the terminals 17 of the phase transposition unit 11 there is applied a voltage corresponding to vector 40 (FIG. 10), the positioning of the voltage vector across the terminals 18 (FIG. 7) is determined by which ever of the switches 14, 15 and 16 is on. If the switch 15 is on, the voltage vectors of the terminals 17 and 18 of the phase transposition unit 11 coincide. If the switch 14 is on, to the conductor of the phase A of the terminals 18 there is applied the voltage of the phase C at the terminals 17, which corresponds to a counterclockwise 120° turn of the vector 40 (FIG. 10), so that the voltage vector of the terminals 18 (FIG. 7) assumes the position of a voltage vector 41 (FIG. 10). If the switch 16 (FIG. 7) is on, to the conductor of the phase A of the terminals 18 there is applied the voltage of the phase B at the terminals 17, which corresponds to a clockwise 120° turn of the voltage vector 40 (FIG. 10), so that the voltage vector of the terminals 18 (FIG. 7) assumes the position of a voltage vector 42 (FIG. 10).

Thus, a turn of the voltage vector by an angle of 0°, 120°, or 240° effects commutation of the switches 14, 15 or 16 (FIG. 7) of the phase transposition unit 11.

The coupling transformer 12 (FIG. 8) changes stepwise the phase of the voltage applied to said coupling transformer 12 by 180°. The transformer 12 also performs smooth voltage regulation.

The phase of the applied voltage is changed by 180° through a change of the group of windings' connection of the transformer 19 of the coupling transformer 12, which is done with the aid of the switches 22, 23, 24 and 25.

As voltage is applied to the terminals 26 of the coupling transformer 12, the positioning of the vector of the voltage across the terminals 27 is determined by whichever of the switches 22, 23, 24 and 25 is on.

Figure 8:
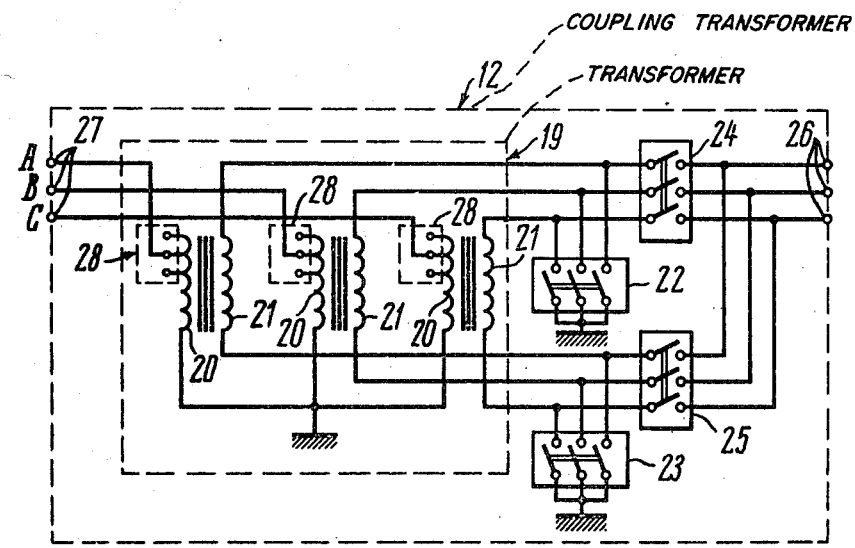
FIG. 8 is a block diagram of a coupling transformer with a switchable group of windings' connections, in accordance with the invention.

If the switches 23 and 24 are on, and the switches 22 and 25 are off, the windings 20 and 21 of the transformer 19 are connected like this: Yo/Y−12. The vector of the voltage across the terminals 27 is not turned in this case with respect to the vector 40 (FIG. 10) of the voltage across the terminals 26 (FIG. 8).

If the switches 22 and 25 are on, and the switches 23 and 24 are off, the windings 20 and 21 of the transformer 19 are connected like this: Yo/Y−6. In this case, the vectors of the voltages across the terminals 27 and 26 are displaced in relation to each other by 180°. Thus, if to the terminals 26 of the coupling transformer 12 there is applied the voltage to which the vector 40 (FIG. 10) corresponds, a vector 43 (FIG. 10) corresponds to the voltage across the terminals 27 (FIG. 8). If to the terminals 26 (FIG. 8) of the coupling transformer 12 there is applied the voltage to which corresponds the vector 41 (FIG. 10), a vector 44 (FIG. 10) corresponds to the voltage across the terminals 27 (FIG. 8). If to the terminals 26 (FIG. 8) of the coupling transformer 12 there is applied the voltage to which corresponds the vector 42 (FIG. 10), a vector 45 (FIG. 10) corresponds to the voltage across the terminals 27 (FIG. 8).

The series connection of the phase transposition unit 11 (FIG. 1) and the coupling transformer 12 makes it possible to change the phase of the applied voltage within the range of 0° to 360° by steps of 60°. When the terminals 18 (FIG. 7) of the phase transposition unit 11 are connected to the terminals 26 (FIG. 8) of the coupling transformer, the phase shift between voltages across the terminals 17 (FIG. 7) and 27 (FIG. 8) is determined by the state of the switches 14, 15 and 16 (FIG. 7) and 22, 23, 24 and 25 (FIG. 8).

When the switch 15 (FIG. 7) of the phase transposition unit 11 and the switches 23 and 24 (FIG. 8) of the coupling transformer 12 are on, the resultant phase shift effected by the phase transposition unit 11 and the coupling transformer 12 is zero. When the switch 14 (FIG. 7) of the phase transposition unit 11 and the switches 22 and 25 (FIG. 8) of the coupling transformer 12 are on, the resultant phase shift effected by the phase transposition unit 11 and the coupling transformer 12 is equal to 60°. When the switch 16 (FIG. 7) of the phase transposition unit 11 and the switches 23 and 24 (FIG. 8) of the coupling transformer 12 are on, the resultant phase shift effected by the phase transposition unit 11 and the coupling transformer 12 is equal to 120°. When the switch 15 (FIG. 7) of the phase transposition unit 11 and the switches 22 and 25 (FIG. 8) of the coupling transformer 12 are on, the resultant phase shift effected by the phase transposition unit 11 and the coupling transformer 12 is equal to 180°. When the switch 14 (FIG. 7) of the phase transposition unit 11 and the switches 23 and 24 (FIG. 8) of the coupling transformer 12 are on, the resultant phase shift effected by the phase transposition unit 11 and the coupling transformer 12 is equal to 240°. When the switch 16 (FIG. 7) of the phase transposition unit 11 and the switches 22 and 25 (FIG. 8) of the coupling transformer 12 are on, the resultant phase shift effected by the phase transposition unit 11 and the coupling transformer 12 is equal to 300°.

The transverse voltage regulation transformer 13 (FIG. 9) smoothly regulates the voltage phase.

The voltage across the terminals 31 of the transverse voltage regulation transformer 13 is a sum total of the voltage across the terminals 32 and the voltage across the secondary winding 30 of the transformer 29. When to the primary winding 38 of the transformer 29 there is applied the voltage which is shifted in phase in relation to the voltage across the terminals 32, the phase of voltage across the terminals 31 changes with respect to that of the voltage across the terminals 32, thus, the phase of the voltage across the terminals 31 is shifted with respect to that of the voltage across the terminals 32.

Figure 11:
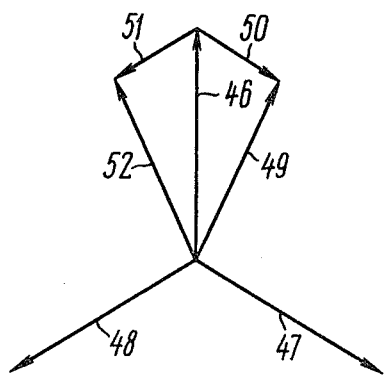
FIG. 11 is a vector voltage diagram of the transverse voltage regulation transformer, in accordance with the invention.

When the switch 35 is on and the switch 34 is off, the voltage of the phase B across the terminals 32 is applied via the auxiliary transformer 33 to the phase A of the primary winding 38 of the transformer 29. Voltage vectors 46, 47 and 48 (FIG. 11) correspond to the phases A, B and C at the terminals 32.

A vector 49 (FIG. 11) of the voltage of the phase A at the terminals 31 (FIG. 9) is produced by adding up the vector 46 (FIG. 11) of the phase A voltage at the terminals 32 (FIG. 9) and a vector 50 (FIG. 11) of the phase A voltage at the secondary winding 30 (FIG. 9) of the transformer 29, which is parallel to the vector 47 (FIG. 11) of the phase B voltage at the terminals 32 (FIG. 9). The vector 49 (FIG. 11) is shifted clockwise with respect to the vector 46 by the required angle. The magnitude of this angle is adjusted by changing the magnitude of the vector 50 of voltage across the secondary winding 30 (FIG. 9) of the transformer 29, which is determined by the number of turns of the secondary winding 37 of the auxiliary transformer 33 and is set by the means 36 for smoothly changing the number of turns of the secondary winding 37.

When the switch 34 is on and the switch 35 is off, the voltage of the phase C of the terminal 32 is applied via the auxiliary transformer 33 to the phase A of the primary winding 38 of the transformer 29. By adding up a vector 51 (FIG. 11) of the phase A voltage of the secondary winding 30 (FIG. 9) of the transformer 29, which is parallel to the vector 48 (FIG. 11) of the phase C voltage across the terminals 31 (FIG. 9), and the vector 46 (FIG. 11) of the phase A voltage across the terminals 32, there is produced a resultant vector 52 of the voltage across the terminals 31.

While smoothly regulating the voltage phase with the aid of the transverse voltage regulation transformer 13, a displacement of the vector 49 or 52 (FIG. 11) of the voltage across the terminals 31 (FIG. 9) with respect to the vector 46 (FIG. 11) of the voltage across the terminals 32 (FIG. 9) is accompanied by a decrease in the vector 49 or 52 (FIG. 11) of the voltage, as compared to the vector 46. This decrease is compensated for by the means 28 (FIG. 8) for smoothly changing the number of turns of the winding 20 of the transformer 19 of the coupling transformer 12.

The series connection of the phase transposition unit 11 (FIG. 1), the coupling transformer 12 and the transverse voltage regulation transformer 13, which has a voltage phase adjustment range of not less than ±30°, makes it possible to shift the phase within the range of 0° to 360°.

When the terminals 18 (FIG. 7) of the phase transposition unit 11 are connected to the terminals 26 (FIG. 8) of the coupling transformer 12, and the terminals 27 of the coupling transformer 12 are connected to the terminals 32 (FIG. 9) of the transverse voltage regulation transformer 13, the switches 14, 15 and 16 (FIG. 7) of the phase transposition unit 11, the switches 22, 23, 24 and 25 (FIG. 8) of the coupling transformer 12, the switches 34 and 35 (FIG. 9) of the transverse voltage regulation transformer 13, the means 28 (FIG. 8) for smoothly changing the number of turns of the winding 20 of the transformer 19 per se of the coupling transformer 12, and the means 36 (FIG. 9) for smoothly changing the number of turns of the winding 37 of the auxiliary transformer 33 of the transverse voltage regulation transformer 13 make it possible to effect any phase shift between the voltages across the terminals 17 (FIG. 7) and 31 (FIG. 9) of the device 1 (FIG. 1) for connecting a tuned power transmission line to an a.c. network.

Upon completing the aforesaid commutations of the switches to ensure a required phase shift between the voltage across the bars 4 of the sending station 5 and that across the bars 7 of the local power system 8, the device 1 for connecting the tuned power transmission line 2 to the a.c. network 3 is connected with the terminals 17 of the phase transposition unit 11 to the bars 7 of the local power system 8.

Then, the transverse voltage regulation transformer 13 acts upon the means 28 (FIG. 8) for smoothly changing the number of turns of the winding 20 of the transformer 19 of the coupling transformer 12 and the means 36 (FIG. 9) for smoothly changing the number of turns of the winding 37 of the auxiliary transformer 33, so that the voltage is equal in magnitude and phase to the voltage across the bars 4 (FIG. 1) of the sending station 5. After this, the terminals 31 (FIG. 9) of the transverse voltage regulation transformer 13 are connected to the bars 4 (FIG. 1) of the sending station 5.

With the aid of the means 28 (FIG. 8) for smoothly changing the number of turns of the winding 20 of the transformer 19 of the coupling transformer 12 and the means 36 for smoothly changing the number of turns of the winding 37 of the auxiliary transformer 33 of the transverse voltage regulation transformer 13, there is ensured a required overflow of active and reactive power between the bars 4 (FIG. 1) of the sending station 5 and the bars 7 of the local power system 8.

Alternative embodiments of the device 1, for connecting a tuned power transmission line to an a.c. network, comprising the phase transposition unit 11, the coupling transformer 12 and the transverse voltage regulation transformer 13, which are interconnected in series, are shown in FIGS. 2, 3, 4, 5, and 6. The devices according to these embodiments operate similarly to the device 1 for connecting the tuned power transmission line 2 to the a.c. network 3 of FIG. 1.

What is claimed is:

1. A device for connecting a tuned power transmission line to an a.c. network, comprising:
   a phase transposition unit which is connected to the a.c. network and effects a phase shift of voltage through an angle which is a multiple of the natural phase shift between voltages of opposite phases;
   a coupling transformer which is connected to said phase transposition unit and matches the voltages of said tuned power transmission line and the a.c. network and effects a voltage phase shift which is a multiple of 180°; and a transverse voltage regulation transformer which is connected to said coupling transformer and said tuned power transmission line to smoothly change the voltage phase shift under load.

2. A device for connecting a tuned power transmission line to an a.c. network, comprising:
 a phase transposition unit which is connected to the a.c. network and effects a phase shift of voltage through an angle which is a multiple of the natural phase shift between opposite phases;
 a transverse voltage regulation transformer which is connected to said phase transposition unit to smoothly change the voltage phase shift under load; and
 a coupling transformer which is connected to said transverse voltage regulation transformer and said tuned power transmission line and matches the voltages of said tuned power transmission line and the a.c. network and effects a voltage phase shift which is a multiple of 180°.

3. A device for connecting a tuned power transmission line to an a.c. network, comprising:
 a coupling transformer which is connected to the a.c. network and matches the voltages of said tuned power transmission line and the a.c. network and effects a voltage phase shift which is a multiple of 180°;
 a phase transposition unit which is connected to said coupling transformer and effects a phase shift of voltage through an angle which is a multiple of the natural phase shift between voltages of different phases; and
 a transverse voltage regulation transformer which is connected to said phase transposition unit and said tuned power transmission line to smoothly change the voltage phase shift under load.

4. A device for connecting a tuned power transmission line to an a.c. network, comprising:
 a coupling transformer which is connected to the a.c. network and matches the voltages of said tuned power transmission line and the a.c. network and effects a voltage phase shift which is a multiple of 180°;
 a transverse voltage regulation transformer which is connected to said coupling transformer to smoothly change the voltage phase shift under load; and
 a phase transposition unit which is connected to said transverse voltage regulation transformer and said tuned power transmission line and effects a voltage phase shift through an angle which is a multiple of the natural phase shift of voltages of opposite phases.

5. A device for connecting a tuned power transmission line to an a.c. network, comprising:
 a transverse voltage regulation transformer which is connected to the a.c. network to smoothly change a voltage phase shift under load;
 a phase transposition unit which is connected to said transverse voltage regulation transformer and effects a voltage phase shift through an angle which is a multiple of the natural phase shift between voltages of opposite phases; and
 a coupling transformer which is connected to said phase transposition unit and said tuned power transmission line and matches the voltages of said tuned power transmission line and the a.c. network and effects a voltage phase shift which is a multiple of 180°.

6. A device for connecting a tuned power transmission line to an a.c. network, comprising:
 a transverse voltage regulation transformer which is connected to the a.c. network to smoothly change a voltage phase shift under load;
 a coupling transformer which is connected to said transverse voltage regulation transformer and matches the voltages of said tuned power transmission line and the a.c. network and effects a voltage phase shift which is a multiple of 180°; and
 a phase transposition unit which is connected to said coupling transformer and said tuned power transmission line and effects a voltage phase shift through an angle which is a multiple of the natural phase shift between voltages of opposite phases.

* * * * *